L. HERRESHOFF.
Machines for Cutting and Cooking Fish.
No. 146,339. Patented Jan. 13, 1874.
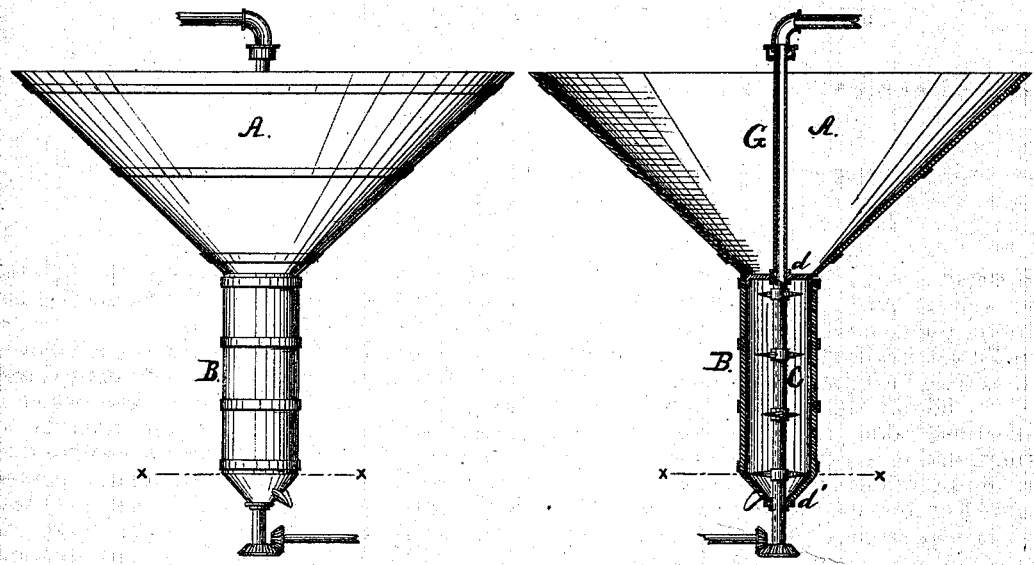
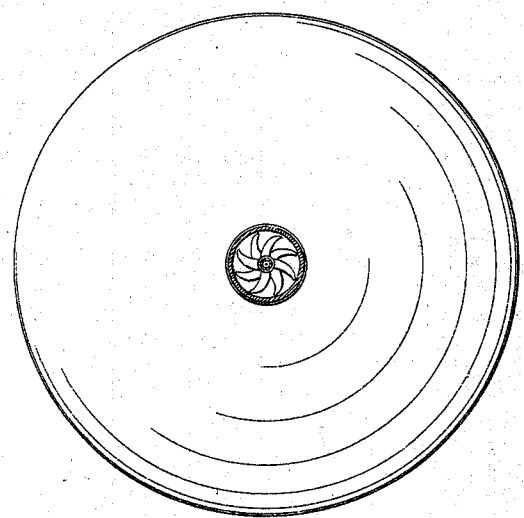
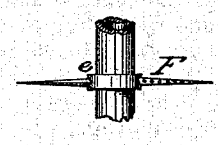
WITNESSES: INVENTOR:

UNITED STATES PATENT OFFICE.

LEWIS HERRESHOFF, OF BRISTOL, RHODE ISLAND.

IMPROVEMENT IN MACHINES FOR CUTTING AND COOKING FISH.

Specification forming part of Letters Patent No. 146,339, dated January 13, 1874; application filed January 29, 1873.

*To all whom it may concern:*

Be it known that I, LEWIS HERRESHOFF, of Bristol, in the county of Bristol and State of Rhode Island, have invented a certain new and useful Device for Cutting and Cooking Fish; and I do hereby declare that the following specification, taken in connection with the drawing making a part of the same, is a full, clear, and exact description thereof.

Figure 1 is an elevation of my device. Fig. 2 is a vertical section. Fig. 3 is a section of cylinder on $x\ x$. Fig. 4 is a view of partial section of shaft, collar, and knife. Fig. 5 is a view of knife edge and back.

My invention is designed more especially for use in connection with the extraction of oil from fish, and has for its object the more convenient and rapid production of the oil; and consists in the device for simultaneously cutting and cooking the fish, hereinafter described.

In the drawing, A, Figs. 1 and 2, is an inverted cone-shaped hopper, resting upon and attached to a cylinder, B, also cone-shaped at its lower end. Passing through the center of the cylinder B is a hollow shaft, C, which revolves in suitable bearings at $d$ and $d'$. Around and firmly attached to the hollow shaft C, I place any desired number of collars, $e$, each having two curved knives, F, projecting from opposite sides, as shown in Figs. 2, 3, 4, and 5. The knives F are made hollow and the back perforated, as shown in Figs. 4 and 5, a passage being made from the inside of the shaft C to the inside of the knives F. The shaft C has motion imparted to it by a suitable gear at its lower end, while its upper end is connected to a steam-pipe, G, passing through the center of the hopper, in such a manner as not to interfere with its revolution.

The operation of my invention is as follows: Motion is imparted to the hollow shaft C and the steam let into the pipe G, from which it passes into the hollow shaft C, and from thence into the knives F, from which it escapes during their revolution. The fish are now poured into the hopper A, from which they pass into the cylinder B, where they are cut by the revolving knives F, cooked by the escaping steam, and finally discharged from the lower end of the cylinder B.

What I claim as my invention, and desire to secure by Letters Patent, is—

1. The device herein described for simultaneously cutting and cooking fish, consisting of the hopper A, cylinder B, shaft C, and knives F, the whole constructed and operating together substantially as herein set forth.

2. The hollow knife F, perforated and operating in the manner and for the purposes described.

3. The knife F, in combination with the hollow shaft C, the whole so constructed and arranged that the steam will pass from the shaft to the knife, in the manner and for the purposes substantially as described.

LEWIS $\overset{\text{his}}{\times}$ HERRESHOFF.
mark.

Witnesses:
G. M. CARPENTER, Jr.,
NATHANIEL L. MORGAN.